United States Patent
Shalem

(12) 
(10) Patent No.: US 6,795,497 B1
(45) Date of Patent: Sep. 21, 2004

(54) USE OF END TO END COMPRESSION DEVICES IN TELECOMMUNICATION NETWORKS

(75) Inventor: Ofer Shalem, Bat-Yam (IL)

(73) Assignee: ECI Telecom Ltd., Petach Tikva (IL)

(*) Notice: Subject to any disclaimer, the term of this patent is extended or adjusted under 35 U.S.C. 154(b) by 800 days.

(21) Appl. No.: 09/711,518

(22) Filed: Nov. 14, 2000

(51) Int. Cl.[7] ............................................... H04B 1/66
(52) U.S. Cl. .................... 375/240; 379/93.08; 370/521; 704/500
(58) Field of Search ................... 379/93.08; 704/500, 704/501, 503, 504; 708/203; 375/240, 249; 370/202, 521

(56) References Cited

U.S. PATENT DOCUMENTS

| | | | |
|---|---|---|---|
| 5,646,946 A | * | 7/1997 | VanderMeer et al. ....... 370/442 |
| 5,682,432 A | * | 10/1997 | Schroder et al. ............. 381/13 |
| 5,973,630 A | * | 10/1999 | Heath ........................... 341/87 |
| 6,512,790 B1 | * | 1/2003 | Sourani ....................... 375/240 |
| 2002/0085631 A1 | * | 7/2002 | Engwer ....................... 375/240 |

* cited by examiner

Primary Examiner—Jean B. Corrielus
(74) Attorney, Agent, or Firm—Nath & Associates PLLC; Harold L. Novick; Marvin C. Berkowitz

(57) ABSTRACT

A method of transmitting signals along a communication path, by a first compression/decompression unit, which method comprises receiving first signals from a first direction along the path, determining based on the received first signals whether a second decompression unit is located along the path in the first direction, receiving second signals from a second direction. In the case it is determined that a second decompression unit is located along the path in the first direction, selecting a compressed or decompressed format for transmission of the second signals responsive to at least one additional parameter, such that the determination that a second decompression unit is located along the path in the first direction does not always bring about selecting the compressed format. Then, the second signals are transmitted in the selected format.

18 Claims, 3 Drawing Sheets

USE OF END TO END COMPRESSION DEVICES IN TELECOMMUNICATION NETWORKS

FIELD OF THE INVENTION

The present invention relates to communication systems and in particular to networks with communication compression units.

BACKGROUND OF THE INVENTION

Many communication links allow compression of the voice signals which they transfer, in order to increase the throughput of the link. At both ends of these links, a compression/decompression unit compresses the signals entering the link and decompresses the signals coming out of the link. In some cases, voice signals of a telephone call pass over a path including a plurality of links on which the signals are compressed. The compression of the signals generally reduces the quality of the voice signals and the quality reduction is a function of the number of times the signals are compressed and decompressed. Therefore a method has been devised to eliminate multiple compressions. In this method, when a decompression unit is aware of an additional compression unit through which the voice signals are to pass along their path, the signals are left in their compressed form. Such a method has been described for example in Applicant co-pending patent application U.S. Ser. No. 09/465,456 filed Dec. 17, 1999 which is hereby incorporated by reference.

The compression/decompression units replace a small percentage of the voice signals during compression with flag bits which notify other units that compression has been performed. These flag bits will be referred to hereinafter as "compression flags". A compression/decompression unit receiving these flag bits on the voice signals in a first direction, preferably refrains from decompressing the voice signals it transmits in the downstream direction. Instead, the compression/decompression unit passes the signals in the downstream direction in their compressed form, as there is an additional compression/decompression unit along the path of the signals for their decompression. Compression flag bits are also transmitted with the signals transmitted in their compressed form. Such a mode of operation is known in the art as "end-to-end compression". If while transmitting compressed signals, the compression flag bits are not received in their entirety, the compression/decompression units revert to the mode wherein the signals are decompressed and transmitted in their decompressed form.

Switching between a state in which the signals are transmitted in the compressed form and a state in which the signals are transmitted in a decompressed form, may involve a short period in which the voice signals are not provided properly to the users. Many such state transitions during a telephone conversation may be very annoying.

SUMMARY OF THE INVENTION

An aspect of some embodiments of the present invention relates to a compression/decompression unit which does not transmit the signals in their compressed form in all cases in which such transmission is possible, i.e., the received signals from the downstream direction include compression flags. Rather, when it is estimated that the possibility to transmit the signals in the compressed form will be only for a short period, the signals are not transmitted in their compressed form. Optionally, the transmission of the signals in the compressed form is prevented when more than a predetermined number of state transitions between transmission of compressed and decompressed signals occurred within recent period of a pre-defined length of time. Such state transitions may occur, for example, when voice signals are transmitted in a conference call.

In some embodiments of the invention, when a decompression unit receives compression flags while transmitting decompressed signals, it determines whether to switch to a state in which it transmits compressed signals based on the time which passed since the most recent time it operated in the compression state. Optionally, only if a predetermined period of time lapsed since the last time the decompression unit operated in the compression state is the unit allowed to return to the compression state, pending the receipt of the appropriate compression flags.

In some embodiments of the invention, the compression flag bits transmitted by compression and decompression units include indication of the unit transmitting the compression flags. The determination of whether to switch to compression state responsive to reception of compression flags is optionally performed responsive to actions related to the specific unit from which the compression flags were received. Thus, when a conference call is terminated and a different call begins through a different compression and decompression unit, the unit receiving the compression flags may switch immediately to the compression state.

According to the present invention there is provided a method of transmitting signals along a communication path, by a first compression/decompression unit, which method comprises:

receiving first signals from a first direction along the path;

determining based on the received first signals whether a second decompression unit is located along the path in the first direction;

receiving second signals from a second direction;

in the case it is determined that a second decompression unit is located along the path in the first direction, selecting a compressed or decompressed format for transmission of the second signals responsive to at least one additional parameter, such that the determination that a second decompression unit is located along the path in the first direction does not always bring about selecting the compressed format; and transmitting the second signals in the selected format.

According to a preferred embodiment of the invention the at least one additional parameter comprises a pre-defined period of time that lapsed since a previous occurrence in which signals were transmitted in the second direction by said first compression/decompression unit in their compressed format. Alternatively or additionally, the at least one additional parameter comprises a number of changes in the transmission format during a recent period. Still alternatively or additionally, the at least one additional parameter comprises a period of time passing since a previous time the first signals were determined to indicate that a second decompression unit is located along the path in the first direction.

In accordance with another preferred embodiment of the invention, the method provided further comprises determining an identification of the second decompression unit located along the path in the first direction, e.g. identification that is derived from the first signals received. According to this embodiment the at least one additional parameter may be either one of the parameters described above or any combination thereof. Alternatively or additionally, the at least one additional parameter may comprise information regarding the number of times a change occurred within a recent period of time, in the determination of whether a second decompression unit having the same identification as that currently received is located along the path in the first direction.

By yet another embodiment of the invention, the selection of a format for transmitting the second signals comprises selecting a decompression format even if an indication that a second decompression unit is located along the path in the first direction is received, when it is estimated that the communication path is leading signals of a conference call. Alternatively or additionally, the selection a format for transmitting the second signals comprises selecting a decompression format even if the received first signals were determined to indicate that a second decompression unit is located along the path in the first direction, if there is a high probability that the content of at least some of the first signals that are expected to be received in the near future will prevent the selection of the compressed format.

By another embodiment of the invention, the result achieved in determination step of the method provided, is affected by the fact whether the first signals implanted by the second compression/decompression unit are received intact.

According to another aspect of the invention, there is provided a compression/decompression unit which comprises:

a first input interface for receiving first signals from a first direction along a communication path;

a second input interface for receiving second signals from a second direction along the communication path;

a selection unit which selects a compressed or decompressed format for transmission of the second signals received, following a determination whether a second decompression unit is operative in the first direction along the communication path, and upon considering at least one additional parameter, such that at least in some cases in which a second decompression unit is determined to be operative in the first direction along the communication path, a decompressed format is selected; and an output interface through which the second signals received through the second input interface are transmitted in the selected format.

Once the decompressed format is selected by the selection unit, the compression/decompression unit should be operative to decompress the second signals received.

Alternatively or additionally, the selection unit selects the decompressed format even when the content of currently received first signals allows selection of the compressed format, if there is a high probability that the content of at least some of the first signals received in the near future will not allow selection of the compressed format.

Still alternatively or additionally, the selection unit is capable of selecting the decompressed format even when the content of the currently received first signals allows selection of the compressed format, if recently received first signals did not allow selection of the compressed format. Similarly, mutatis mutandis, the selection unit selects the decompressed format even when the content of the currently received first signals allows selection of the compressed format, if recently received first signals caused the selection unit to change its selection from the compressed format to the decompressed format.

According to yet another aspect of the invention there is provided a communication transmission system which comprises:

a plurality of compression links which pass signals in a compressed format; and a plurality of compression/decompression units located along said plurality of compression links, each of which is operative to determine whether to transmit signals received from respective compression links in a compressed or decompressed format, responsive to a determination of whether they currently belong to a communication connection which includes at least one additional unit in the direction of transmission and responsive to at least one additional parameter, such that at least in some cases in which the connection includes at least one additional unit in the direction of transmission, the signals are transmitted in the decompressed format.

In a preferred embodiment of the invention, the at least one additional parameter comprises a probability of the current communication connection belonging to a conference call.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
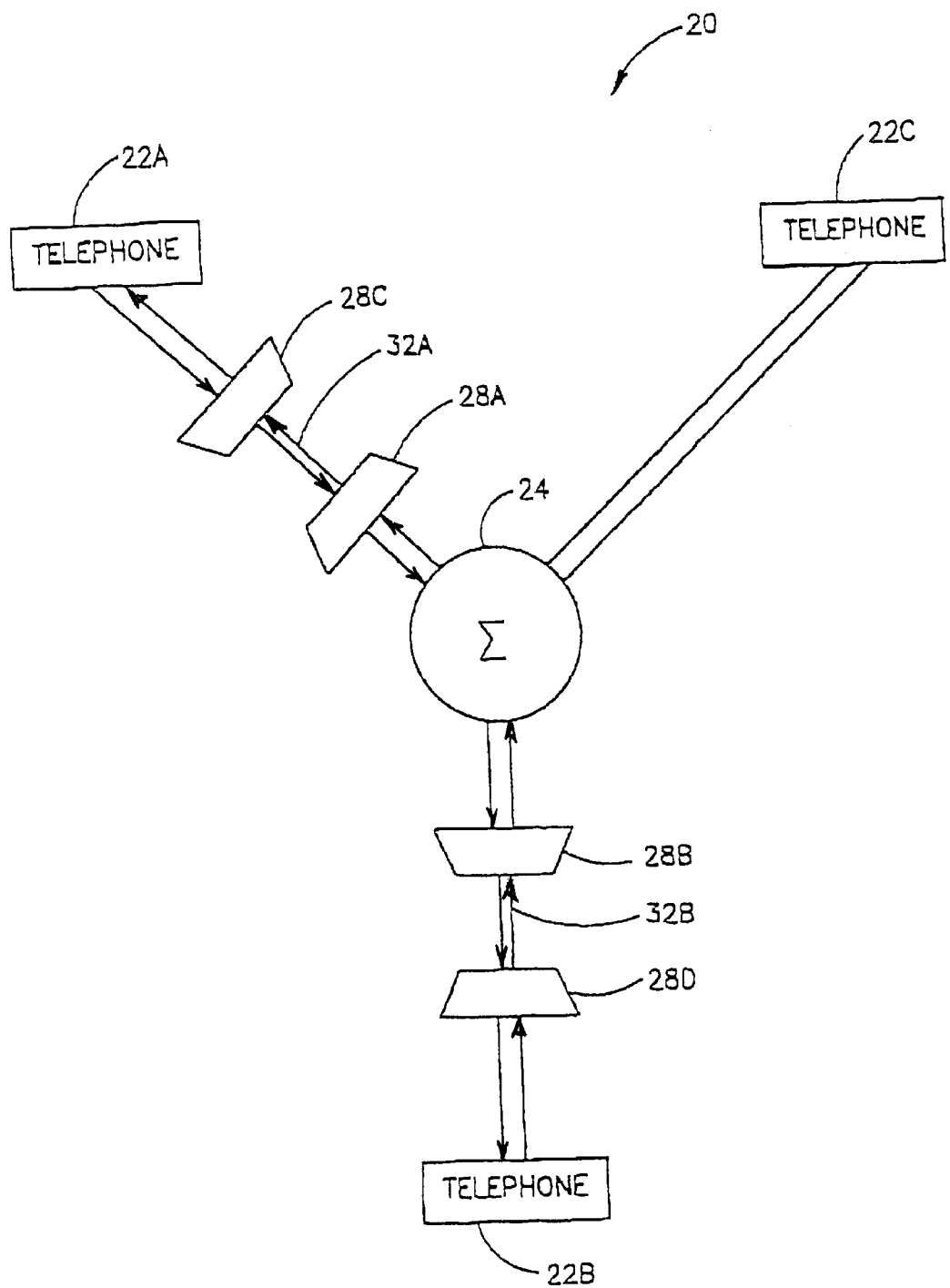
FIG. 1 is a schematic illustration of a conference call connection, in accordance with an embodiment of the present invention.

FIG. 1 is a schematic illustration of a conference call connection 20, in accordance with an embodiment of the present invention. Three telephones 22A, 22B and 22C are connected in a conference session through a conference switch 24. The signals from telephones 22A and 22B pass through links 32 (marked 32A and 32B). At both ends of each of links 32A and 32B, there are compression/decompression units 28 (marked 28A, 28B, 28C and 28D) which compress the signals entering the respective link 32, if the signals are not already compressed, and decompress the signals coming out of the respective link 32, if so required. It is noted that in some embodiments of the invention, units 28 have no direct knowledge on the connection in which they currently are participating, and specifically have no direct knowledge of their connection through conference switch 24.

When telephone 22C is absolutely silent, conference switch 24 passes voice signals only between telephones 22A and 22B as if telephones 22A and 22B are connected through a regular two port connection. The signals from unit 28A which include compression flags indicating the existence of compression means along link 32A, are received intact by unit 28B. The received compression flags notify unit 28B that currently the signals from link 32B may be forwarded in their compressed form. In some embodiments of the invention, unit 28A will likewise identify the existence of unit 28B. It is noted that, the compression flags relate to the possibility of transmitting compressed signals in the downstream direction and do not necessarily indicate whether the signals together with which they are transmitted, are in a compressed state or decompressed state. Also, the reception of compression flags does not necessarily cause unit 28B to transmit compressed signals, as described with more detail below with respect to FIG. 2.

When the user of telephone 22C talks and the user of telephone 22A is absolutely silent, unit 28B receives signals does not identify and further compressing/decompressing unit along the transmission path to telephone 22C. Therefore, unit 28B operates in a decompressing state in which the signals received from link 32B in their compressed form, are decompressed and forwarded towards switch 24 as decompressed signals. When both the users of telephones 22A and 22C talk, switch 24 will provide unit 28B with a weighted sum of the signals from telephones 22C and 22A. This weighted sum will generally not include the compression flags, as the compression flags from unit 28A will be corrupted in the summation of the signals by switch 24.

The speakers in conference calls generally change rapidly. If unit 28B actually transmits the signals from link 32B in compressed form in response to receipt of the compression flags from unit 28A, unit 28B may switch between transmitting compressed and decompressed signals many times in a single conference call. Generally, when such state transitions occur, telephone 22C may receive, for short periods, compressed signals (which it cannot handle) or telephones 22A and/or 22C may receive a weighted sum of compressed and non-compressed signals (which is indecipherable), for short periods.

Figure 2:
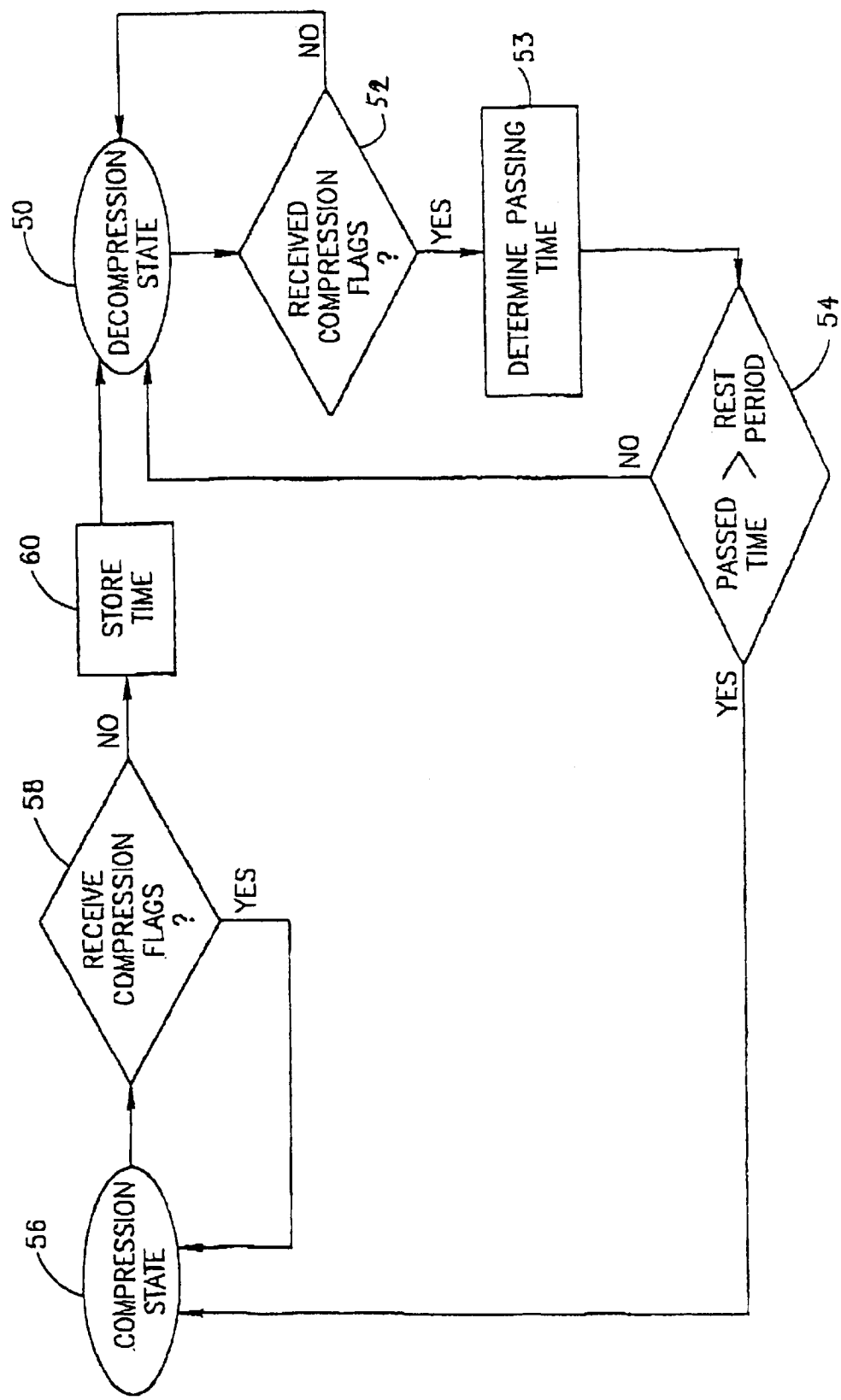
FIG. 2 is a flowchart of the actions performed by a compression/decompression unit in determining whether to transmit compressed or decompressed signals, in accordance with an embodiment of the present invention.
Figure 3:
FIG. 3 is a functional block diagram of a compression/decompression unit.
Figure 3:
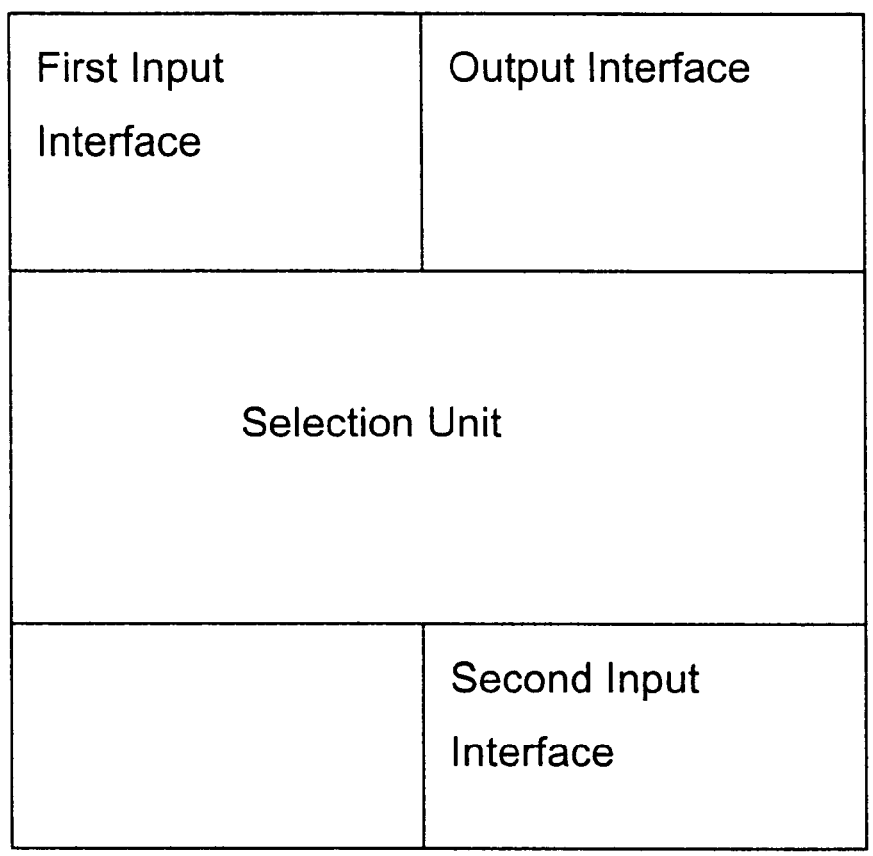

FIG. 2 is a flowchart of the acts performed by unit 28B in determining whether to transmit compressed or decompressed signals, in accordance with an embodiment of the present invention. Typically, unit 28B operates in a decompression state (50) in which the signals from link 32B are transmitted in their decompressed form. If (52) the received signals entering link 32B include compression flags, unit 28B determines (53) the period of time that passed since the previous time it was in a compression state (56), i.e. the last time the signals from link 32B were transmitted in their compressed form. Optionally, if (54) the period of time that passed since the previous time unit 28B was in compression state (56) is longer than a predetermined rest period, unit 28B switches to compression state 56. Otherwise, unit 28B remains in decompression state 50.

Allowing a rest period between leaving and returning to compression state (56) prevents unit 28B from repeatedly switching between decompression state (50) and compression state (56). The length of the rest period is optionally chosen to be equal to an average length of conference calls. Alternatively, shorter periods are used so as to minimize the time in which compression state (56) is not used in regular calls. In accordance with a preferred embodiments of the invention, the rest period is between about 0.5–2 minutes although substantially any other suitable period may be used.

Alternatively or additionally, the decision on whether to switch to compression state (56) depends on the recent history of the received compression flags. In some embodiments of the invention, even after the rest period, unit 28B does not switch to compression state (56) if the pattern of compression flags received during the rest period indicates that a conference call is still in effect. In an exemplary embodiment of the present invention, unit 28B moves to compression state (56) only if compression flags were received for a predetermined time. Alternatively or additionally, unit 28B switches to compression state (56) only if, before the compression flags currently received, the unit did not receive compression flags for a predetermined period. Further alternatively or additionally, unit 28B switches to compression state (56) only if the number of transitions between receiving and not receiving compression flags is beneath a predetermined number. If (58) during compression state (56), unit 28B receives signals which do not include compression flags, unit 28B immediately switches back to decompression state (50). Optionally, before switching to decompression state (50), unit 28B stores (60) the time at which it left compression state (56), for later use in determining (53) the amount of time that passed since the previous time unit 28B was in compression state (56). Alternatively or additionally, unit 28B keeps a record of the recent state history of the unit, i.e., the recent times in which unit 28B was in each of states (50) and (56). Further alternatively or additionally, unit 28B keeps a record of the recent history of receiving compression flags, i.e., when the signals it received included compression flags.

In some embodiments of the invention, the length of the rest period is a function of the number of times unit 28B recently moved into compression state (56), i.e., the number of state transitions between states (50) and (56). Optionally, the length of the rest period increases with the number of transitions. In some embodiments of the invention, if unit 28B recently moved into compression state (56) only once, unit 28B moves back into compression state 56 even if the amount of time that passed since the previous time unit 28B was in compression state (56) is very short.

Alternatively or additionally, the length of the rest period depends on the length of time the unit was recently in compression state (56). For example, if unit 28B was in decompression state (50) only for a short period the state transition is most likely due to a conference call and the rest period is set to be relatively long, i.e., until the conference call is expected to end. If on the other hand, unit 28B was in decompression state (50) for a relatively long period, the state transition is most likely due to the end of a call and therefore the rest period is set to be relatively short.

By some embodiments of the invention, the compression flags, implanted by units 28 in the voice signals, include identification of the unit Optionally, the state history of unit 28B and/or the history of reception of compression flags includes identification of the specific unit 28 transmitting the compression flags for each history entry.

In some embodiments of the invention, the determination of whether to move to compression state (56) responsive to currently received compression flags is performed based on, essentially only, previously received compression flags carrying the same identification and/or based on state transitions responsive to such compression flags. That is, the determination of the passing time, the number of recent state transitions and/or the length of time recently in compression state (56) are determined substantially only based on occurrences related to the same identification as the currently received compression flags.

Alternatively, all compression flags previously received are taken into account in determining whether to switch to compression state (56). Optionally, as described above, the compression flags are given the same weight regardless of the identification they carry. Alternatively, compression flags carrying the identification of the currently received compression flags are given different weight than compression flags carrying different identifications than the current flags. In an exemplary embodiment of the invention, a first rest period is required before entering compression state (56) based on reception of compression flags carrying a different identification than carried by the compression, flags which were received the previous time unit 28B was in state (56). A second rest period, optionally longer than the first rest period, is required before moving into compression state (56) based on reception of compression flags carrying the same identification as carried by the compression flags which were received the previous time unit 28B was in state (56).

In some embodiments of the invention, each unit 28 has a predetermined identification for each of its channels. Alternatively, each unit 28 has a single predetermined identification which is used for all of its channels. Further alternatively, unit 28 periodically selects a random identification for transmission in the compression flags of each channel.

In some embodiments of the invention, substantially all units 28 operate using the same method, i.e., one of the methods described above in relation to unit 28B. Alternatively or additionally, a communication connection includes a plurality of units 28 which determine whether to move to compression state (56) using different methods. Optionally, the signals transmitted along a path between two units 28 must both be either compressed or decompressed. Alternatively, the signals transmitted along the path may be compressed in one direction and non-compressed in the other direction.

In some embodiments of the invention, before units 28 that are associated with different compression links 32, transmit to each other compressed signals, they carry out a handshake procedure before switching to compression state (56). The determination of whether to switch to compression state (56) is optionally performed before the handshake procedure. Alternatively, the handshake procedure is performed every time compression flags are received and determination of whether to switch to compression state (56) is performed after the handshake procedure. Further alternatively, the handshake procedure begins only in some cases before the determination, for example, when additional information, which may be gathered while performing the handshake procedure, is required in order to determine whether to switch to state (56).

It should be noted that the present invention is not limited to networks of the configuration shown in FIG. 1 or to any other specific configuration. Specifically, in some embodiments of the invention, the link leading to telephone 22C may include a compression link segment 32. In such a case, any connection between two telephones 22 allows use of compression state (56), but if switch 24 provides a weighted sum of signals from two or more telephones, compression state (56) is typically not to be used.

Although the above description relates to avoiding repeated state transitions between compressed and decompressed states in a conference call, the principles of the above description may be implemented to avoid state transitions due to other causes. It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. A method of transmitting signals along a communication path, by a first compression/decompression unit, comprising:

receiving first signals from a first direction along the path;

determining based on the received first signals whether a second decompression unit is located along the path in the first direction;

receiving second signals from a second direction;

in the case it is determined that a second decompression unit is located along the path in the first direction, selecting a compressed or decompressed format for transmission of the second signals responsive to at least one additional parameter; and transmitting the second signals in the selected format.

2. A method according to claim 1, wherein the at least one additional parameter comprises a pre-defined period of time passing since a previous occurrence by which signals were transmitted in the second direction by said first compression/decompression unit in the compressed format.

3. A method according to claim 1, wherein the at least one additional parameter comprises a number of changes in the transmission format during a recent period.

4. A method according to claim 1, wherein the at least one additional parameter comprises a period of time passing since a previous time the first signals were determined to indicate that a second decompression unit is located along the path in the first direction.

5. A method according to claim 1, comprising determining an identification of the second decompression unit located along the path in the first direction.

6. A method according to claim 5, wherein the at least one additional parameter comprises a period of time passing since a previous time an indication that said second decompression unit is located along the path in the first direction.

7. A method according to claim 5, wherein the at least one additional parameter comprises a number of times the result of the determination of whether a second decompression unit having the same identification as that currently received is located along the path in the first direction, changed recently.

8. A method according to claim 1, wherein selecting a format for transmitting the second signals comprises selecting a decompression format even if an indication that a second decompression unit is located along the path in the first direction is received, when it is estimated that the communication path is leading signals of a conference call.

9. A method according to claim 1, wherein selecting a format for transmitting the second signals comprises selecting a decompression format even if the received first signals were determined to indicate that a second decompression unit is located along the path in the first direction, if there is a high probability that the content of at least some of the first signals that are expected to be received in the near future will prevent the selection of the compressed format.

10. A method according to claim 1, wherein determining based on the received first signals whether a second decompression unit is located along the path in the first direction comprises determining whether signals implanted by a decompression unit are received intact.

11. A method according to claim 1, wherein receiving the second signals comprises receiving the second signals in a compressed format.

12. A compression/decompression unit, comprising:
- a first input interface for receiving first signals from a first direction along a communication path;
- a second input interface for receiving second signals from a second direction;
- a selection unit which selects a compressed or decompressed format for transmission of the second signals received, based on identification of the existence of a second decompression unit in the first direction along the communication path and at least one additional parameter, such that at least in some cases in which a second decompression unit is determined to be located in the first direction along the communication path, a decompressed format is selected; and
- an output interface through which the second signals received through the second input interface are transmitted in the selected format.

13. A compression/decompression unit according to claim 12, adapted to decompress the second signals if the decompressed format is selected by the selection unit.

14. A compression/decompression unit according to claim 12, wherein the selection unit selects the decompressed format even when the content of currently received first signals allows selection of the compressed format, if there is a high probability that the content of at least some of the first signals received in the near future will not allow selection of the compressed format.

15. A compression/decompression unit according to claim 12, wherein the selection unit selects the decompressed format even when the content of the currently received first signals allows selection of the compressed format, if recently received first signals did not allow selection of the compressed format.

16. A compression/decompression unit according to claim 15, wherein the selection unit selects the decompressed format even when the content of the currently received first signals allows selection of the compressed format, if recently received first signals caused the selection unit to change from the compressed format to the decompressed format.

17. A communication transmission system, comprising:
- a plurality of compression links which pass signals in a compressed format; and
- a plurality of compression/decompression units located along said plurality of compression links, each of which is operative to determine whether to transmit signals received from respective compression links in a compressed or decompressed format, responsive to a determination of whether they currently belong to a communication connection which includes at least one additional unit in the direction of transmission and responsive to at least one additional parameter, such that at least in some cases in which the connection includes at least one additional unit in the direction of transmission, the signals are transmitted in the decompressed format.

18. A communication system according to claim 17, wherein the at least one additional parameter comprises a probability of the current communication connection belonging to a conference call.

* * * * *